United States Patent [19]

Talbot et al.

[11] Patent Number: 5,610,614
[45] Date of Patent: Mar. 11, 1997

[54] REAL-TIME KINEMATIC INITIALIZATION TEST SYSTEM

[75] Inventors: Nicholas C. Talbot, Cupertino; Michael T. Allison, Santa Clara, both of Calif.; Peter Griffioen, Clayton, Australia

[73] Assignee: Trimble Navigation Limited, Sunnyvale, Calif.

[21] Appl. No.: 528,506

[22] Filed: Sep. 13, 1995

[51] Int. Cl.⁶ .......................... H04B 7/185; G01S 5/02; G01C 21/00; H04B 17/00
[52] U.S. Cl. .................... 342/352; 342/357; 364/449.1; 455/67.5; 455/67.6; 455/226.1
[58] Field of Search ................................. 342/357, 352, 342/173; 364/449; 455/67.5, 67.6, 226.1

[56] References Cited

U.S. PATENT DOCUMENTS

| | | | |
|---|---|---|---|
| 4,641,254 | 2/1987 | Mitchell | 364/580 |
| 5,548,293 | 8/1996 | Cohen | 342/357 |

*Primary Examiner*—Gregory C. Issing
*Attorney, Agent, or Firm*—Thomas E. Schatzel; Law Offices of Thomas E. Schatzel A Prof. Corporation

[57] ABSTRACT

A real-time kinematic system includes base and rover GPS units connected by a data link. The rover unit is typically moved to points of interest during a survey while the base remains over a fixed, and known location. An initialization testing program of the present invention is mounted on a personal computer platform that forces in the rover a loss of signal tracking, thus simulating losses in signal reception caused by obstructions of the satellite signals. A complete initialization is forced to occur. The test program uninitializes the RTK solution by causing a loss of integer ambiguities resolution by forcing a loss of lock on one or more satellites. The test program then monitors the subsequent initialization process, e.g., the time needed to search for phase ambiguity candidates, discovering the prevalent satellite geometry, determination of whether the correct ambiguity candidate was found, finding the ratio of the second best to best solution variances of the ambiguity candidates in the list throughout the candidate propagation process or similar statistical test, computing the RMS error of the solution at the time that initialization was declared and after initialization, and calculating the baseline vector between the rover and base at the time of initialization and after initialization. All such statistical parameters are logged and used in post and real-time analyses of the initialization algorithm.

8 Claims, 3 Drawing Sheets

REAL-TIME KINEMATIC INITIALIZATION TEST SYSTEM

BACKGROUND OF THE INVENTION

1. Field of the Invention

The invention relates generally to navigation satellite receiver systems and more specifically to manufacturing and analysis fixtures used to test and verify the proper operation and initialization of real-time kinematic receiver systems.

2. Description of the Prior Art

Centimeter-accurate global positioning system (GPS) navigation depends on being able to resolve individual cycles of carrier phase from an orbiting satellite to a navigation receiver. The many cycles of phase that could be in the neighborhood of a code-based position solution create an ambiguity that is difficult, but not impossible to resolve. The integer number of cycles to each of several satellites simultaneously indicates the correct unique integer-ambiguity solution.

Real-time kinematic (RTK) surveying is a valuable branch in the science of GPS positioning. RTK has substantially improved surveying productivity in the field. RTK eliminates the time consuming post-processing of satellite data that had been an inescapable part of conventional kinematic and static GPS surveying. Quality assurance indicators are produced in real-time that guarantee the results will be good before vacating a site. In the past, cycle slips, especially at the reference GPS receiver, prevented post-processing the kinematic data and such problems were latent and ruinous. With RTK, this and other blunders in field procedures are detectable and thus costly re-surveys can be avoided.

Although RTK systems, such as the SITE SURVEYOR™ from Trimble Navigation (Sunnyvale, Calif.), have been commercially available for some time, such products require static initialization for carrier integer ambiguity resolution. The maximum benefits of RTK are only realized when such initialization processes are independent of system motion, are fully automatic and are transparent to the user/surveyor.

The performance of RTK systems is often judged by the reliability of initialization and the time it takes a receiver to initialize, both of which are interrelated. The time it takes a receiver to initialize is defined here as the time needed to produce the first centimeter-level accurate output, e.g., after a complete loss of lock on all satellites. Test conditions require four, preferably five or more satellites to be visible, in order to rely on highly efficient integer search strategies. The accuracy of the centimeter-level output of a RTK system is also a key element of the system performance.

Up until a few years ago, commercial RTK systems for land surveying were simply not available. However, GPS systems for navigation and positioning were already a well-established industry standard for a variety of geodetic survey applications. Surveyors using GPS systems relied on traditional post-processing with data collection times that could range up to an hour. A technique called FAST STATIC™ data collection reduced this to a few minutes. Post-processed kinematic was effective, but was risky without good satellite visibility, especially without knowledge of satellite tracking at the base receiver.

The ability to perform surveys in real-time has many benefits across a variety of applications. Real-time communications between the reference and multiple rover stations provides integrity checking. Users are able to navigate to survey marks very accurately. But static RTK systems require the user to suffer an initialization procedure while the receiver remains stationary when first used in the field.

During initialization, the conventional GPS surveyors require occupation of a known survey mark or the location of two antennas approximately at the same place using an initializer plate. These constrain the field procedure, and can cause problems when the satellite signals become obstructed, e.g., when a user passes under a bridge. In such a case the user would be forced to return to a known point, or reinitialize the survey in some other manner.

Fully automatic ambiguity resolution (FAAR), as commercially developed by Trimble Navigation, avoids having to initialize from a known mark. A stationary base unit provides reference signals to a "rover" unit that moves about to conduct a survey. There is no constraint on the rover during initialization, it may be stationary or moving. This process has two performance parameters associated with it, the initialization reliability and the time to. initialize. Both initialization time and initialization reliability are key criteria for a commercial user of a real-time kinematic system.

SUMMARY OF THE PRESENT INVENTION

It is therefore an object of the present invention to provide a tester for verifying the reliability and time to initialize real-time kinematic rover units used in centimeter-level accurate survey equipment.

It is a further object of the present invention to provide a method for verifying the reliability and time to initialize real-time kinematic rover units used in centimeter-level accurate survey equipment.

Briefly, a real-time kinematic system includes base and rover GPS units connected by a data link. The rover unit is typically moved to points of interest during a survey while the base remains over a fixed, and known location. Generally, the base antenna is located to optimize a clear view of the sky. The rover antenna will often be obstructed by trees, buildings in such a way that the signals are interrupted and a initialization process is preferably restarted. Continuous kinematic operation involves keeping the base station still while the rover is moved over an area. An initialization testing program of the present invention is mounted on a personal computer platform that intentionally forces in the rover a loss of signal tracking, thus simulating losses caused by physical obstructions of the sky. A complete initialization is forced to occur, as happens when the rover unit is first switched on. The test program uninitializes the RTK solution by causing a loss of integer ambiguities resolution by forcing a loss of lock on one or more satellites. The test program then monitors the subsequent initialization process, e.g., the time to acquire satellite signal tracking, the accuracy of float solutions, the time needed to search for phase ambiguity candidates, discovering the prevalent satellite geometry, determination of whether the correct ambiguity candidate was found, finding the ratio of the second best to best solution variances of the ambiguity candidates in the list throughout the candidate propagation process or any similar statistical test, computing the RMS error of the solution at the time that initialization was declared, and calculating the baseline vector between the rover and base at, and after, the time of initialization with known (truth) vector calculated from a previous survey. All such statistical parameters are logged and used in post and real-time analysis of the initialization algorithm.

It is an advantage of the present invention that a tester is provided for verifying the reliability and time to initialize real-time kinematic rover units used in centimeter-level accurate survey equipment.

It is a further advantage of the present invention that a method is provided for verifying the reliability and time to initialize real-time kinematic rover units used in centimeter-level accurate survey equipment.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
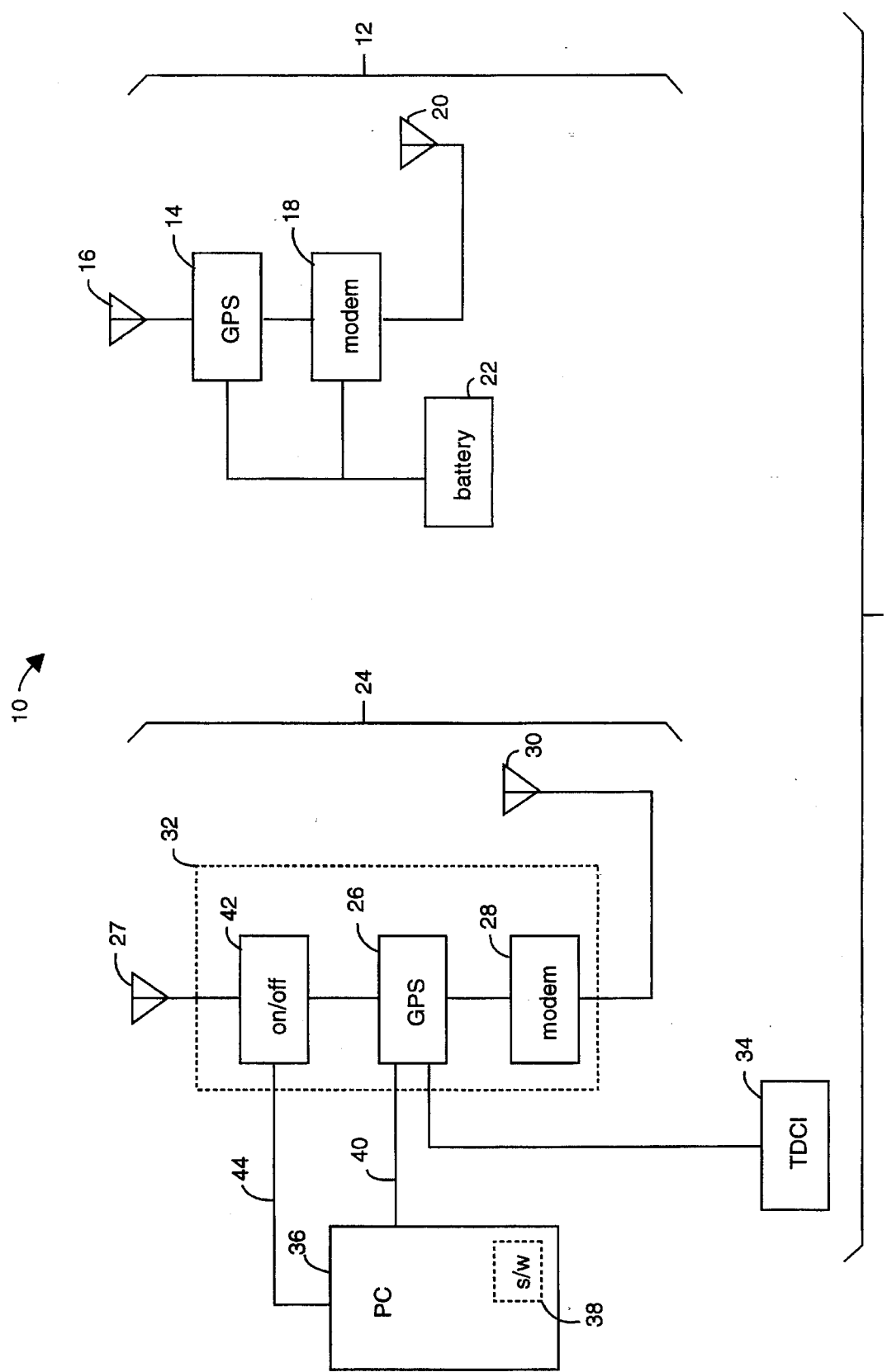
FIG. 1 is a block diagram of a real-time kinematic on-the-fly rover and base unit connected in an initialization test configuration with a test computer and test software.

FIG. 1 illustrates a test system embodiment of the present invention, referred to by the general reference numeral 10. A real-time kinematic (RTK) base station 12 includes a GPS receiver 14 with a tripod mounted lightweight antenna 16, a radio modem 18 with a UHF antenna 20, and a battery 22. A roving unit 24 is similar, and includes a GPS receiver 26 and microwave antenna 27, a radio-modem 28 and UHF antenna 30 all contained in a backpack 32. The UHF antenna 30 can be mounted on the frame of the backpack. A handheld graphical survey data collector/computer 34, such as a TRIMBLE DATA COLLECTOR™ (TDCI), provides a user interface and is mounted on a kinematic bipod or range pole together with the GPS antenna 27. The roving unit 24 is meant to be carried by one person. Preferably, low-power receivers are used to provide for many hours of surveying using standard camcorder batteries. Additional radio-modems, e.g., TRIMTALK™ units by Trimble Navigation (Sunnyvale, Calif.), can be used as repeaters to allow coverage of a large or obstructed area. Thus, line-of-sight is not required between the base and rover.

The graphical survey data collector/computer 34 can be preloaded with a survey or construction database of coordinates and baselines. This allows graphical navigation, known to surveyors as stake out or set out, to predetermined points where new physical marks are preferably established. Alternatively, the unknown positions of existing marks can be determined and stored in the graphical survey data collector/computer 34 for later transfer to a survey software package mounted on a personal computer platform, e.g., GPSURVEY™, TRIMMAP™, or TRIMNET™, all marketed by Trimble Navigation.

The satellite range measurements used by the receivers to compute a baseline vector between the reference and rover antennas 16 and 27 rely on accurate assessment of carrier phase, e.g., of either or both carriers "L1" and "L2". These phase measurements are inherently ambiguous by an integer number of carrier wavelengths. Determining these integers, e.g., resolving the integer ambiguities is fundamental to initializing RTK, and can be achieved in a variety of ways.

Reinitialiation is required whenever a continuous lock on four or more satellites is lost. Prior art single-frequency GPS surveying equipment requires occupation of a known survey mark or use of an initializer plate. Nevertheless, such L1-only systems provide most of the important productivity benefits of RTK, albeit while using less expensive receiver technology. When such inexpensive systems are used in open areas where the satellite visibility is good, the field productivity approaches that of the more costly dual-frequency technology.

The Trimble Navigation GPS TOTAL STATION™ and other similar commercial products support such static initialization methods. The Trimble Navigation GPS TOTAL STATION™ also supports fully automatic ambiguity resolution, which is effective when the rover is static or moving. Initialization while moving is called on-the-fly (OTF), e.g., RTK-OTF. In both static and moving initialization the techniques are similar, and each relies on high quality dual-frequency observables from the GPS receivers. Both L1 and L2 pseudoranges and full-cycle L1 and L2 carrier phase measurements are made available, regardless of any encryption of the precision code signal. Low power operation is essential for field operation, and commercially available integrated circuit technology can be employed, e.g., the MAXWELL signal processing technology developed by Trimble Navigation.

Reliable and fast automatic initialization requires a minimum of four, but preferably five satellites, and can be thereafter maintained with only four satellites. Conventional GPS post-processed survey techniques collected information over time frames that were long enough to observe a significant change in satellite geometry.

The GPS receiver 26 initializes in several conventional steps. First, the integer ambiguities are estimated by forming float ambiguities from combined pseudorange and carrier phase. This enables a differential float-ambiguity solution. Then these estimates are filtered separately, or part of a position filter to reduce the effects of measurement noise. An integer search is next conducted to identify the correct set of integer ambiguities. The RTK solution is initialized and the differential fixed-ambiguity position solution is enabled. Lastly, the correct initialization is verified prior to storing survey quality positions.

When four satellites become visible, differential positioning can begin using a float-ambiguity solution. The accuracy of this is limited by the pseudorange noise which is dominated by local multipath. Sub-meter performance is typical and similar to differential positioning using RTCM differential beacon techniques. Ambiguity resolution also can start, but an integer search will not be invoked until sufficient filtering occurs with four or more satellites visible at both the reference station and rover.

The integer search is bolstered by a surplus of satellites. By using highly-optimized search techniques, the use of a math coprocessor is not necessary to reduce the search computation time. All the kinematic baseline processing can be completed by the rover GPS receiver 26, and this helps reduce overall power consumption. Such hardware minimization is a priority for field portable equipment.

Following the integer search, the RTK system is preliminarily initialized and fixed-ambiguity centimeter-level positioning begins. Although the ambiguities are typically resolved with high confidence, a further integer verification step is usually necessary before allowing a survey to begin. This increases the probability of correct initialization to an acceptable level.

Once initialized, a subsequent loss of initialization and search is considerably enhanced when two or more satellites have managed to be continuously tracked. One or two surviving double-differenced integers bridge over the loss of initialization. This then significantly reduces the number of potential integer combinations and speeds a final integer solution. Such a situation is more the norm than a complete loss of tracking of all the satellites.

Initialization integrity relates to the confidence with which the carrier integers are resolved. In other words, the confidence level that correct initialization was obtained. When L1 and L2 observables are combined, practically instantaneous initialization can be achieved. However, this is of little interest to the surveyor unless it is the usual case for the many varied field environments, e.g., multipath, tropospheric and ionospheric effects, poor satellite visibility, geometry, etc., and with a very high initialization success rate.

The need to verify initialization stems from the fact that an incorrect set of integer ambiguities can appear to be a better statistical choice, but this situation is ephemeral. Even after initialization verification, solution quality is continuously monitored, quality assurance (QA) measures are derived from statistical parameters to identify the unlikely case of initialization failure.

When static at a survey mark, quality assurance indicators are used to ensure that the occupation time is sufficient to meet survey accuracy requirements selected by the surveyor. Covariance matrices are stored along with the positions for post-mission network adjustment. As a last line of defense, every position solution is associated with a unique initialization segment. Information pertaining to this segment is stored within the receiver 26. Then external devices, such as the TDCI handheld survey controller, are enabled to determine if an initialization error has occurred at any time after an RTK survey has started. Should a problem ever be detected, erroneous positions can be eliminated from the survey data base.

The FAAR process lends itself well to automated testing. Unlike the L1-only SITE SURVEYOR™ RTK system which requires intervention by the surveyor to initialize, the FAAR process will initialize without any user supplied information. Testing software was developed on a personal computer to take advantage of this attribute.

A personal computer (PC) 36 includes a test program 38 that monitors the automatic initialization process of receiver 26. A serial port, e.g., RS-232-type input/output port, is connected through a cable 40 from the receiver 26 to the PC 36. The connection of cable 40 also allows the PC 36 to probe the internal mechanisms of the receiver 26 to uninitialize the RTK solution in whole or in part. At the lowest level of severity, the receiver 26 is instructed to discard some or all of the integers it resolved. At the highest level, the software completely severs the reception of satellite signals, effectively emulating an antenna disconnection.

In an alternative embodiment, a hardware switch 42 is connected by a wire 44 that allows the PC 36 to connect and disconnect the antenna 27 with the receiver 26. Disconnection forces a complete loss of satellite tracking and thus precipitates a reinitialization.

The connection of cable 40 allows the PC 36 to monitor the receiver 26 throughout its automatic initialization process steps. Data is downloaded to the PC 36 to a parameter file, e.g., data representing the time taken to initialize and data representing the baseline vector components. The parameter file then supports a later analysis of the quality and speed of the initialization. Preferably, the test software is run twenty-four hours a day, for a whole week, with each day providing data on many hundreds of initializations per receiver. This produces large statistical samples in which small changes in system design can be correlated to their effect on system performance.

In addition to in-depth data analysis using one RTK base-rover pair, various FAAR strategies can be compared. One base station 12 can service many RTK rovers 24. Personal computers running the test software can be connected to each rover to record individual system performance. Test-beds can be used for short (0–2 km) and long (5–10 km) lines. For the longer lines, telephone modems can be used to maintain a link with the base to allow continuous testing without the need for setting up remote radio repeaters between the base and rovers. The telephone modem at the rover site is connected to a radio modem which rebroadcasts the base station measurements.

In one test configuration, each rover was loaded with a different version of RTK firmware to include various choices of filter parameters and statistical thresholds used by the initialization routines. In other configurations, the rover hardware varies. All rovers share the same GPS antenna via a coaxial splitter. Thus, each rover received the same base station measurements and made simultaneous measurements at the same antenna. Having each receiver set up identically in all other respects, including details such as elevation masks, eliminated all variables except the FAAR strategies. This allowed the equivalent of years worth of field initializations using different processing strategies to be observed and compared. The rover receivers, although stationary, were operating in the roving mode. Thus all initializations were on-the-fly so a static constraint was not placed on the position solution while determining the integer ambiguities. Alternatively, the rover receivers could be operated in a static mode to determine static performance. Multipath at the rover was not rapidly changing as it would if the rovers were truly moving and that would make both initialization and initialization error detection more difficult.

The PC 36 may comprise an IBM-compatible type running Microsoft DOS or a workstation running UNIX. The test program 38 preferably provides a display of the ambiguity search information, error display and tracing, storage of position and solution statistical information, ambiguity search summary storage, and logging of errors and faults. Such a combination of the diagnostic and debugging tools can greatly improve an RTK development process.

In particular, the test program 38 preferably comprises IBM-PC 386/486/PENTIUM™ host environment with Microsoft WINDOWS, or similar ilk. The interface over the cable 40 to the receiver 26 is a 38,400 baud serial RS232 port. Information sent to a user display preferably includes solution statistics, error log, processor RTK status information and ambiguity search data. Storage includes solution statistical summary, error log, processor RTK status information and ambiguity search data. The solution statistics include all information generated by the RTK baseline processor that is relevant to the baseline solution and its associated errors. Baseline vector estimates from the RTK processor are preferably displayed in either geodetic (latitude, longitude, height), local tangent plane (east, north, up) or Cartesian coordinates (X, Y, Z). The position information is preferably represented initially as text. A graphical "snail-trail" plot is preferably provided to show any position solutions. A time-trace plot is a valuable graphical tool for analysis. Double-difference measurement residual information is preferably displayed initially as text indicating the satellite identities, the measurement type, and the residual value. The graphical residual display should include a plot of residual values using colors for each double-difference satellite combination. The solution dilution of precision (DOP) is displayed as text or graphics. A list of the tracked satellites, frequency bands tracked, cycle slip information and the double-difference satellite combinations are preferably provided as text. Time-line tracking information and a skyplot can be done graphically for easier reading. An epoch estimate of the measurements' root-mean-square (RMS) filtered and unfiltered value is preferably displayed for the user during testing. The current motion state of the receiver under test is preferably displayed to indicate whether the processor is treating the data as static, kinematic (moving), or as known baseline occupation.

An ambiguity search is at the heart of many RTK systems. The condition of the ambiguity search at any one point is very important to the overall operation of the processor in the receiver 26. So the various status information is preferably displayed by the test software 38 and the PC 36. The number of fixed/float integer ambiguities should be displayed for L1/L2, or any combination, e.g., "wide-lane" or "narrow-lane" bands. Information regarding the current state of the ambiguity search is preferably displayed, and includes the time taken to generate the search list, the total number of candidates scanned to generate the search list, the search window used to generate the search candidates, the number of candidates in the search list, the RMS figure of the best ambiguity candidate, the RMS ratio of the best candidate to the next best candidate, the number of degrees of freedom accumulated in the search, and the number of satellites used in the search. The double difference float ambiguity estimates for each satellite combination are also important in the user display. The fixed integer ambiguity values are preferably displayed for each double-difference satellite combination that has been successfully resolved. Error information generated by the baseline processor, such as slippage faults, are preferably logged to a file and displayed in a screen log.

The receiver 26 includes a processor board for which the test software 38 maintains a status screen. Detailed information is displayed to the user during test procedures about the current hardware and software operation of the system, e.g., processor firmware version, processor loading, power levels, base receiver packet error rates, and system configuration information.

All the information collected and displayed is interpreted by an expert user to determine the acceptability or relative performance of FAAR or other RTK initialization firmware included in the receiver 26.

Figure 2:
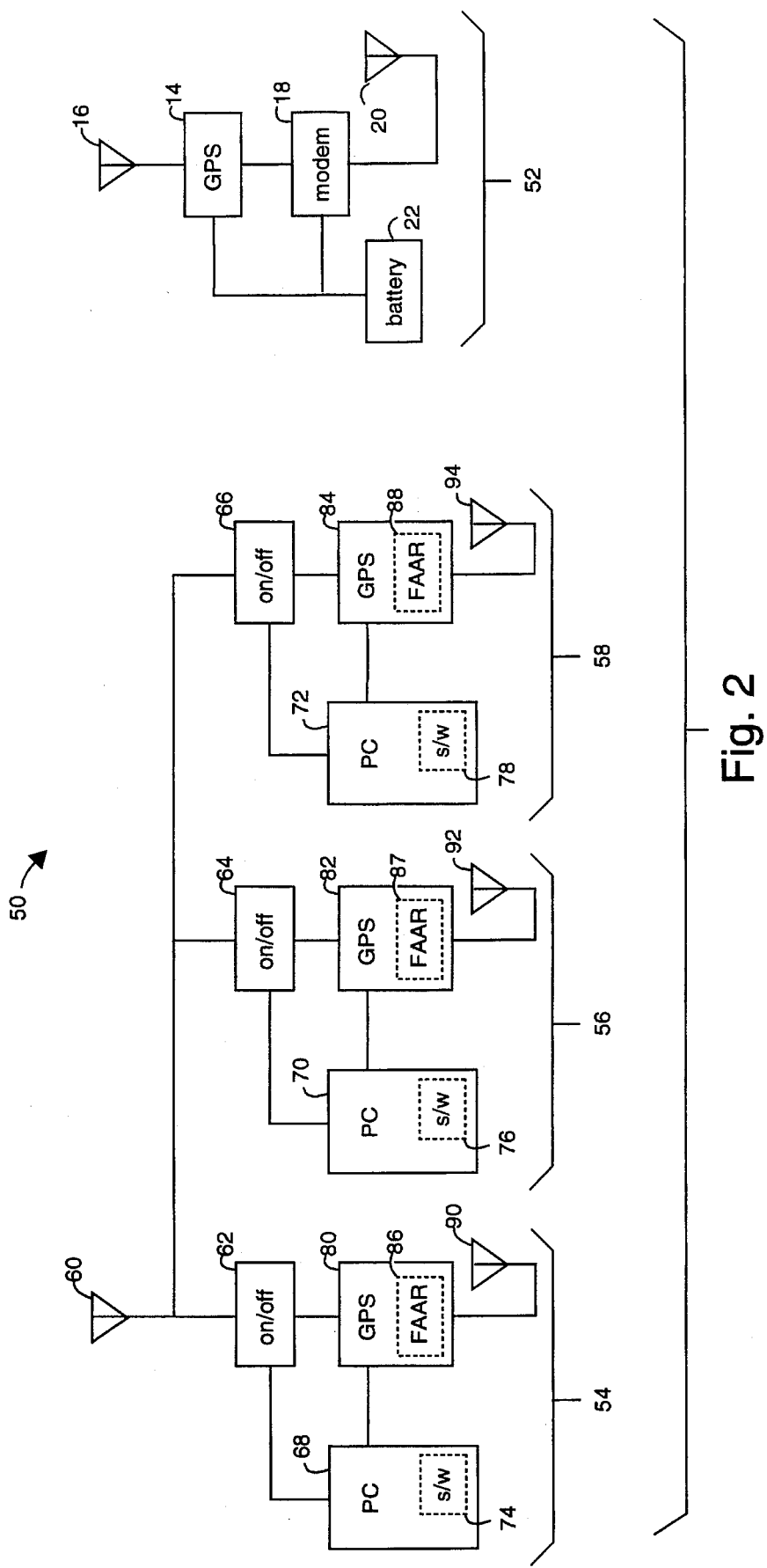
FIG. 2 is a block diagram of a test system configured to compare the RTK-OTF initialization performance of several rover units that differ in their embedded initialization firmware, their hardware configuration, etc.

FIG. 2 shows a test system 50 configured to compare the RTK-OTF initialization performance of several rover units that differ in their embedded initialization firmware, e.g., FAAR, or differ in their hardware configuration. The test system 50 comprises a base station 52 that is similar to the base station 12 (FIG. 1) and therefore repeats all the same element numbers. A plurality of RTK-OTF rover units 54, 56, and 58 all share a common microwave antenna 60. A plurality of switches 62, 64, and 66 control access to the antenna 60. A set of test computers 68, 70 and 72 are controlled by a corresponding identical set of test softwares 74, 76, and 78. Each pair of test computer and software monitors a corresponding set of RTK-OTF GPS navigation receivers 80, 82, and 84. Each receiver has a corresponding, but different, embedded initialization firmware 86, 87, and 88 for resolving the integer ambiguities in the carrier signals received by antenna 60, and/or different hardware. A set of UHF antennas 90, 92, and 94 all receive the same differential correction and other data linked from antenna 20 at the base station 52.

Since the receivers 80, 82, and 84 all share the same antenna 60, the solution of integers and interference from multipath presents the same problems to all, therefore comparisons of the initialization performance between FAAR firmwares 86, 87, and 88, or receiver systems, will be meaningful. The test data for each FAAR firmware 86, 87, and 88 will be correspondingly developed for user inspection in the memories and user display screens of computers 68, 70, and 72.

Figure 3:
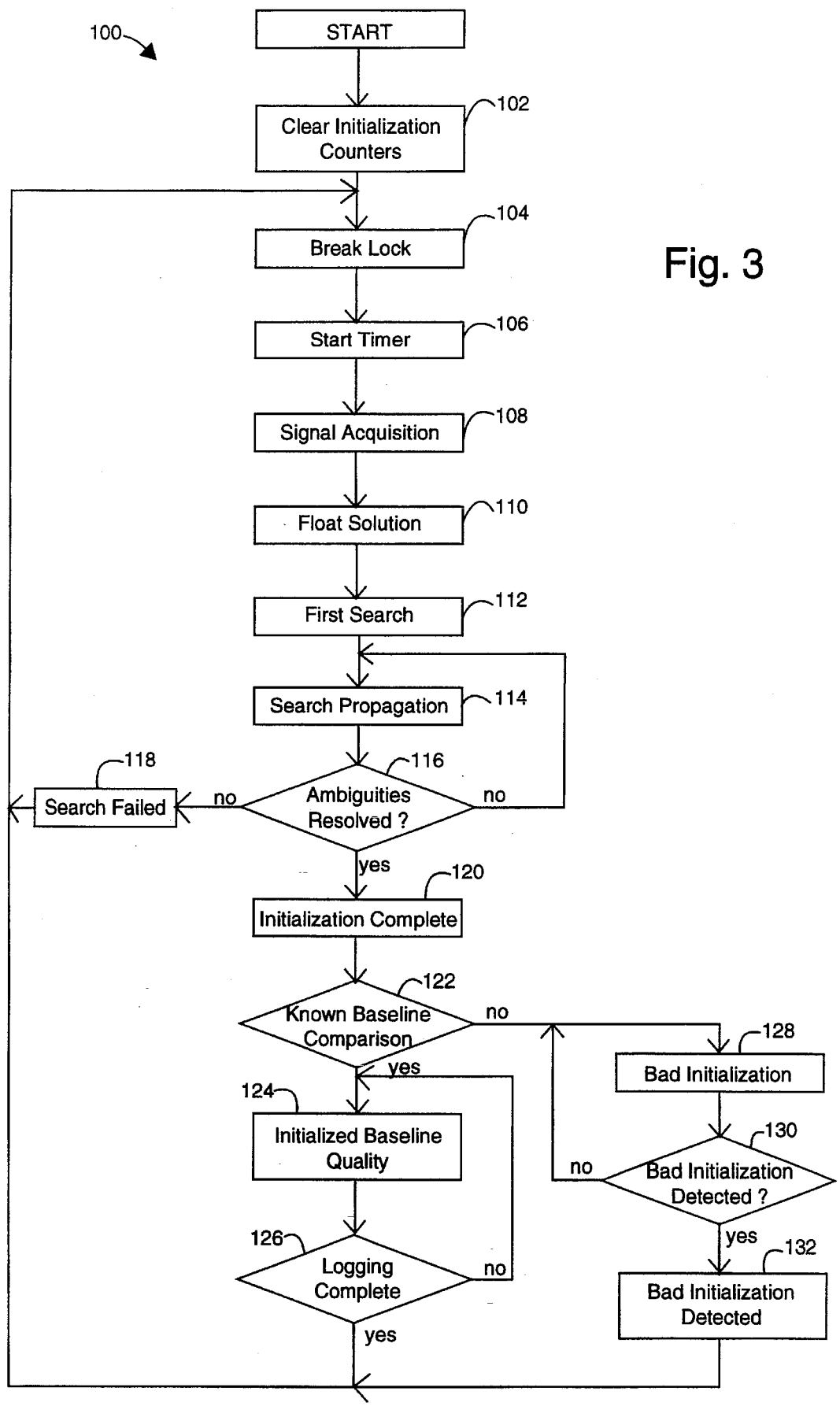
FIG. 3 is a flowchart of a representative test program for the test system of FIG. 2.

FIG. 3 uses a flowchart to represent a test program 100, which is an example of an implementation of the test program 38. No doubt one skilled in the art could code other software to accomplish the same ends. The test program 100 comprises a step 102 to clear a set of initialization counters. A step 104 breaks the receiver's lock or clears the ambiguity resolved for one or more satellites. A step 106 starts a timer. A step 108 logs the time needed by the receiver to acquire signal tracking and measurement taking. A step 110 logs the time of the first float baseline, logs the baseline vector components, logs the satellite geometry, and logs the baseline vector RMS. A step 112 logs the time, number of candidates searched and stored, satellite geometry, and time taken to generate candidate list in a first search. Search propagation is done in a step 114, logs are made of the number of candidates in the list, the location of correct candidate in the list, the search ratio (second best to best), and the RMS of the best candidate. A step 116 checks to see if the rover has resolved the ambiguities. If not, a search failed step 118 logs the time, the RMS, the ratio, the satellite geometry, and the location of the correct candidate in the list. Control then passes back to the step 104 to repeat the loop. Otherwise, an initialization complete step 120 logs the time, the RMS, the ratio, and the baseline vector and increments the initialization counter. The baseline computed is compared with the known baseline in a step 122. If the baseline is within a tolerance level, e.g., ±5 centimeters, an initialized baseline quality step 124 logs the success, the baseline vector, the solution RMS and the satellite geometry. A step 126 checks to see if the logging is complete. If not, control returns back to the step 124. If complete, control passes back up to the step 104. If the baseline was out of tolerance in the step 122, control passes to a bad initialization step 128 that logs the time, the RMS, the ratio, and the baseline vector. A step 130 checks to see if a bad initialization was detected. If not, the step 128 is repeated. If so, a bad initialization step 132 logs the time, the RMS and the baseline vector. Control then passes back to the step 104 to repeat the loop.

In the field, rovers and base sites can experience high ionospheric activity, a nonuniform troposphere, or high signal multipath which lead to overly long initialization times in some environments. These conditions have so far proved to be impossible to reproduce on a test bed. In difficult environments, it has proven very valuable to have users store data in the field at the base and rover sites.

GPS measurement data collected at the base and rover sites is then post-processed using the same real-time kinematic engine that is used in the GPS rover receiver to perform ambiguity initialization and real-time centimeter-level positioning. Similarly, the initialization test system is then used in a post-processed fashion. The real-time data link is replaced by data files that can be synchronized in time and replayed forwards or backwards from any starting point in time in the files. By having data post-processed, many hypotheses regarding the improvement of ambiguity initialization can be tested, and then rejected or accepted. A more rapid convergence can therefore be made on improved real-time kinematic algorithms without having the expense of radio data links or time from repeated on-line experiments.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A real-time kinematic (RTK) system tester comprising:

an antenna switch for placement between an RTK rover receiver and an associated satellite navigation receiver antenna and having a control input to disconnect said antenna from said rover receiver;

a computer platform connected to control the antenna switch through signals applied to said control input and having a data input port for connection to said rover receiver and for gathering statistical information from said rover receiver related to RTK initialization and carrier phase ambiguity candidate selection, prevalent satellite geometry, the accuracy of ambiguity candidate selection, the ratio of second best to best solution variances of the ambiguity candidates in the list throughout a candidate propagation process, a baseline vector computed, and the root-mean-square (RMS) error of such solutions at the time that an initialization completed; and computer program means mounted on the computer platform for processing and analyzing said statistical information from said rover receiver and for providing a summary of said RTK initialization conducted by said rover receiver.

2. A system for real-time kinematic initialization testing, comprising:

a rover navigation receiver with real-time kinematic (RTK) positioning means for on-the-fly centimeter-level positioning using the ambiguous phase of carrier signals transmitted from orbiting navigation satellites, wherein a RTK initialization process involves an ambiguity resolution of the number of integer cycles in range to each satellite being tracked; and computer hardware and software means connected to the rover navigation receiver for displaying to a test operator the average time it takes said RTK initialization process to initialize, the reliability of said RTK initialization process, time it takes said RTK initialization process to detect and reject bad initializations, and the accuracy of estimated coordinates before and after initialization.

3. The system of claim 2, further comprising:

a base navigation receiver for stationary operation at a known reference point and connected to provide reference position information and satellite observables to the rover navigation receiver, and providing for a real-time kinematic system wherein the base navigation receiver is connected by a data link to the rover navigation receiver.

4. The system of claim 3, wherein:

said test software provides for uninitialization of a respective RTK solution in the rover unit by at least one of: forcing a loss of integer ambiguities, forcing a loss of lock on one or more satellites, and an antenna disconnection to disable all satellites; and said test software further provides for monitoring the initialization process of each rover unit, including the time to search for phase ambiguity candidates, the prevalent satellite geometry, whether the correct ambiguity candidate was found, the ratio of second best to best solution variances of the ambiguity candidates in the list throughout the candidate propagation process, RMS error of the solution at the time of initialization, and the baseline vector at the time of initialization.

5. A test system for comparing the performance of differing real-time kinematic initialization firmware, comprising:

a base station for providing reference signals derived from orbiting navigation satellites over a data link and providing support for centimeter-accurate survey operation;

a plurality of rover units each connected to a single common antenna which they share, wherein the carrier integer ambiguity resolution for said orbiting navigation satellites should be the same for every rover unit by virtue of said shared antenna;

a plurality of real-time kinematic initialization firmwares distributed amongst the rover units and comprising at least two different fully automatic ambiguity resolution (FAAR) firmware types that permit each rover unit to be moving during initialization; and a plurality of test computers and test software each respectively connected to the rover units to control access to said single common antenna and providing for the monitoring of performance parameters associated with the initialization reliability and the time to initialize of respective ones of said FAAR firmware types.

6. The system of claim 5, wherein:

said test softwares provide for uninitialization of a respective RTK solution in the rover unit by at least one of: forcing a loss of integer ambiguities, forcing a loss of lock on one or more satellites, and an antenna disconnection to disable all satellites; and said test softwares further provide for monitoring the initialization process of each rover unit, including the time to search for phase ambiguity candidates, the prevalent satellite geometry, whether the correct ambiguity candidate was found, the ratio of second best to best solution variances of the ambiguity candidates in the list throughout the candidate propagation process, RMS error of the solution at the time of initialization, and the baseline vector at the time of initialization.

7. The system of claim 5, wherein:

said test softwares simulate a loss of signal tracking caused by overhead obstructions of the sky to orbiting navigation satellite transmissions and simulate a complete loss initialization equivalent to when a rover unit is switched on.

8. A test system for comparing the real-time kinematic initialization performance of differing navigation satellite receiver configurations, comprising:

a base station for providing reference signals derived from orbiting navigation satellites over a data link and providing support for centimeter-accurate survey operation;

a plurality of dissimilar rover units each connected to a single common antenna which they share, wherein the carrier integer ambiguity resolution for said orbiting navigation satellites should be the same for every rover unit by virtue of said shared antenna;

a plurality of real-time kinematic initialization hardware configurations distributed amongst the rover units providing for fully automatic ambiguity resolution; and a plurality of test computers and test software each respectively connected to the rover units to control access to said single common antenna and providing for the monitoring of performance parameters associated with the initialization reliability and the time to initialize of respective ones of said plurality of dissimilar rover units.

* * * * *